(No Model.)

J. H. BOWLEY.
EGG SHIPPING CASE.

No. 499,708. Patented June 20, 1893.

Witnesses:
S. A. Davenport
E. Behel

Inventor:
Joseph H. Bowley
By A. O. Behel
Attys.

THE NORRIS PETERS CO., PHOTO-LITHO., WASHINGTON, D. C.

UNITED STATES PATENT OFFICE.

JOSEPH H. BOWLEY, OF MARENGO, ILLINOIS, ASSIGNOR OF ONE-HALF TO JOHN W. STOCKWELL, OF SAME PLACE.

EGG SHIPPING-CASE.

SPECIFICATION forming part of Letters Patent No. 499,708, dated June 20, 1893.

Application filed February 24, 1893. Serial No. 463,640. (No model.)

*To all whom it may concern:*

Be it known that I, JOSEPH H. BOWLEY, a citizen of the United States, residing at Marengo, in the county of McHenry and State of Illinois, have invented certain new and useful Improvements in Egg Shipping-Cases, of which the following is a specification.

The object of this invention is to construct a shipping case in which an intermittent rotary movement is imparted thereto by the jolting of the train in transit, and especially adapted for the shipment of eggs in order to prevent the settling of the yelk thereof.

Figure 1:
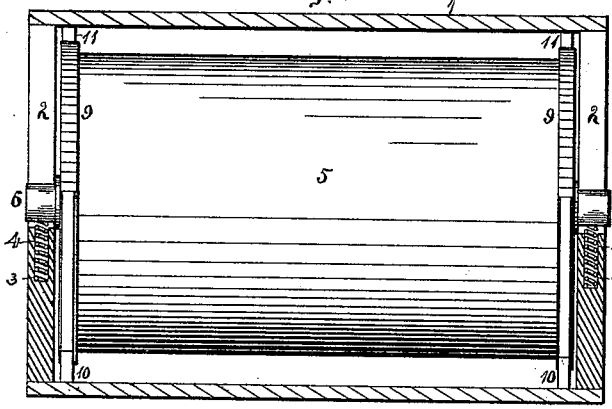
Figure 2:
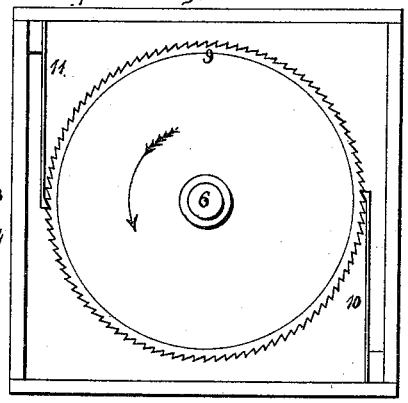
Figure 3:
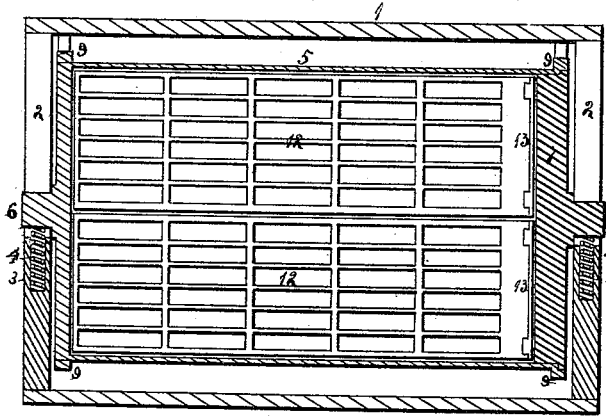
Figure 4:
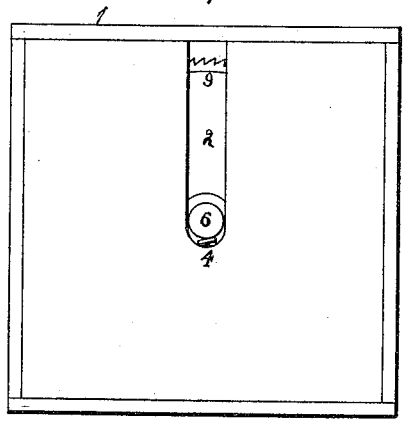
Figure 5:
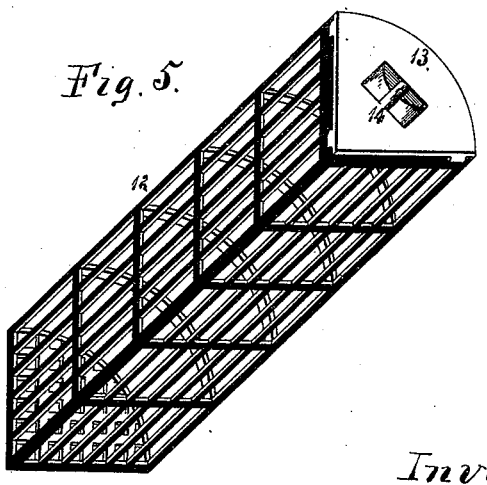

In the accompanying drawings, Figure 1, is a lengthwise vertical section through the outer case. Fig. 2, is an end elevation in which the end of the outer case has been removed. Fig. 3, is a lengthwise vertical section through the inner and outer cases. Fig. 4, is an end elevation of the outer case. Fig. 5, is an isometrical representation of one of the egg containing cases.

In the shipment of eggs which are packed in the ordinary cases, the eggs are held in one position and owing to the jolting of the train the yelk portion of the egg is liable to settle unless they are turned, which is not easily accomplished by the employment of the ordinary case.

By the employment of my improvements a connection is formed between the egg containing case and the outer case so that the jolting of the train through the connecting mechanism will impart a positive intermittent rotary movement to the egg containing case, thereby keeping said case constantly in motion. The case which I have constructed for the purpose consists of an outer box or casing 1, of the required form, having its ends provided with vertical slots 2, and vertical holes 3, at the bottoms of the slots. Springs 4, are placed within the holes 3, and extend above the bottoms of the slots 2. The egg containing case 5, is of cylindrical form having a trunnion 6, extending from one end. The other end 7, is fitted within the open end of the case and has a trunnion 8, extending from its center. Around each end of the case is located a ring 9, formed with saw teeth. A spring dog 10, is secured to the outer casing near the bottom, and a spring dog 11, is secured to the outer casing near its top portion. These dogs are of such form as to fit between the teeth of the rings 9. Dogs similar to those shown at 10 and 11 are provided for each toothed ring 9. The action of this construction is to impart an intermittent rotary movement to the egg containing case, and is accomplished by the jolting of the train, that is, by reason of the egg containing case being supported upon springs 4, the case is permitted to have a vertical bodily movement, by reason of the jolting of the train. By the vertical movement of the case and the employment of the toothed rings 9, dogs 10 and 11, when the case descends, the dogs 10, will remain in engagement with the teeth of the ring consequently turning the case upon its trunnion support in the direction indicated by the arrow, shown at Fig. 2. During this descension and partially rotary movement of the case, the dog 11, has slipped over the teeth of the ring and will firmly seat itself in a different tooth of the ring. During the upward movement of the case the dog 11, will remain in engagement with the ring causing the case to rotate a short distance, the dog 10, slipping over the teeth of the ring until the case returns to its starting or uppermost position when the dog will again cause the case to rotate when the case again descends. This operation is repeated when the jolting of the train is sufficient to cause the case to move vertically, even if only for the space of one tooth and consequently keeping the eggs constantly on the move, thereby preventing the yelk portion from settling or mixing with the white portion, as the eggs will be turned over a number of times during their transit. Within the egg containing case I locate in this instance four quadrant shaped egg carriers 12, being made from open metallic work so that the eggs may be candled or examined without removing therefrom the egg carrier. A cover 13, is provided for the carrier and has a hook connection therewith and a handle portion 14, in its center. The eggs are placed in this carrier and the carrier placed within the egg containing case, and the whole filled with a packing material such as oats, holding the eggs in position when the covers are secured in place. The removable end of the egg containing case is then placed within its open end and the case placed within the outer casing and the top of the outer casing secured in place when the eggs are ready for shipment.

While I have described my improvements as especially adapted for shipping eggs other articles may be shipped therein, such as fruit which requires its position to be changed during transit.

I claim as my invention—

1. A shipping case consisting of an inner case and an outer case, the inner case supported upon spring bearings and capable of a movement upon its pivotal support, means forming a connection between the cases in order that an intermittent movement may be imparted to the inner case by the jolting of the train in transportation.

2. A shipping case composed of an inner and outer case the inner case supported upon spring bearings and capable of a rotary movement and provided with a toothed circle, and yielding dogs engaging said teeth on opposite sides.

3. A shipping case consisting of an inner and outer case the inner case supported upon spring bearings and capable of a rotary movement and provided with a ring having saw teeth, and yielding dogs engaging the teeth on opposite sides.

JOSEPH H. BOWLEY.

Witnesses:
A. O. BEHEL,
E. BEHEL.